United States Patent
Williams

(10) Patent No.: US 10,434,898 B2
(45) Date of Patent: Oct. 8, 2019

(54) ELECTRIFIED VEHICLE WITH EXPANSION INTERFACE MECHANISM FOR INTERFACING WITH SECONDARY ELECTRICAL DEVICE

(71) Applicant: FORD GLOBAL TECHNOLOGIES, LLC, Dearborn, MI (US)

(72) Inventor: Dustin Williams, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 15/260,630

(22) Filed: Sep. 9, 2016

(65) Prior Publication Data

US 2018/0072178 A1 Mar. 15, 2018

(51) Int. Cl.
| | |
|---|---|
| *H02J 7/00* | (2006.01) |
| *B60L 58/21* | (2019.01) |
| *B60L 1/00* | (2006.01) |
| *B60L 7/18* | (2006.01) |
| *B60L 58/12* | (2019.01) |
| *B60L 58/20* | (2019.01) |
| *B60W 10/26* | (2006.01) |
| *B60W 20/00* | (2016.01) |

(52) U.S. Cl.
CPC .............. *B60L 58/21* (2019.02); *B60L 1/00* (2013.01); *B60L 1/003* (2013.01); *B60L 7/18* (2013.01); *B60L 58/12* (2019.02); *B60L 58/20* (2019.02); *H02J 7/0013* (2013.01); *H02J 7/0045* (2013.01); *B60L 2200/10* (2013.01); *B60L 2200/36* (2013.01); *B60W 10/26* (2013.01); *B60W 20/00* (2013.01); *H02J 7/0027* (2013.01); *H02J 7/0068* (2013.01); *H02J 2007/0096* (2013.01); *Y02T 10/7005* (2013.01); *Y02T 10/7044* (2013.01); *Y02T 10/7066* (2013.01); *Y10S 903/907* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | |
|---|---|---|
| 7,698,078 B2 | 4/2010 | Kelty et al. |
| 8,862,404 B2 | 10/2014 | Proietty et al. |
| 9,260,024 B1 | 2/2016 | Lau |
| 2011/0025267 A1 | 2/2011 | Kamen et al. |
| 2012/0299538 A1* | 11/2012 | Arai ............ B60L 11/182 320/108 |
| 2012/0303259 A1 | 11/2012 | Prosser |
| 2012/0326665 A1 | 12/2012 | Yin et al. |
| 2013/0167752 A1* | 7/2013 | Barbee ............ B60L 7/24 105/1.4 |
| 2016/0009339 A1 | 1/2016 | Biderman et al. |

* cited by examiner

*Primary Examiner* — Arun C Williams
(74) *Attorney, Agent, or Firm* — Carlson, Gaskey & Olds

(57) ABSTRACT

A method according to an exemplary aspect of the present disclosure includes, among other things, controlling charging and discharging operations of a first high voltage battery of an electrified vehicle and a second high voltage battery of a secondary electrical device connected to the electrical vehicle such that power from the electrified vehicle is selectively used to charge the second high voltage battery and power from the second high voltage battery is selectively discharged to power the electrified vehicle.

22 Claims, 4 Drawing Sheets

ELECTRIFIED VEHICLE WITH EXPANSION INTERFACE MECHANISM FOR INTERFACING WITH SECONDARY ELECTRICAL DEVICE

TECHNICAL FIELD

This disclosure relates to an electrified vehicle. A secondary electrical device may be connected to an expansion interface mechanism of the electrified vehicle. Power is shared between the electrified vehicle and the secondary electrical device to either charge the secondary electrical device or add battery capacity to the electrified vehicle.

BACKGROUND

The need to reduce automotive fuel consumption and emissions is well known. Therefore, vehicles are being developed that reduce reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, in contrast, rely exclusively on an internal combustion engine to drive the vehicle.

A high voltage battery typically powers the electric machines and other electrical loads of the electrified vehicle. The battery includes a plurality of battery cells that store energy. The electric travel range of the electrified vehicle is generally limited by the amount of energy that can be stored within the battery cells.

SUMMARY

A method according to an exemplary aspect of the present disclosure includes, among other things, controlling charging and discharging operations of a first high voltage battery of an electrified vehicle and a second high voltage battery of a secondary electrical device connected to the electrical vehicle such that power from the electrified vehicle is selectively used to charge the second high voltage battery and power from the second high voltage battery is selectively discharged to power the electrified vehicle.

In a further non-limiting embodiment of the foregoing method, controlling the charging and discharging operations includes charging at least one of the first high voltage battery and the second high voltage battery if the electrified vehicle is operating in a hybrid mode.

In a further non-limiting embodiment of either of the foregoing methods, controlling the charging and discharging operations includes charging at least one of the first high voltage battery and the second high voltage battery if the electrified vehicle is operating in a regenerative braking mode.

In a further non-limiting embodiment of any of the foregoing methods, controlling the charging and discharging operations includes discharging at least one of the first high voltage battery and the second high voltage battery if the electrified vehicle is operating in an EV mode.

In a further non-limiting embodiment of any of the foregoing methods, controlling the charging and discharging operations includes alternating between charging the first high voltage battery and charging the second high voltage battery to maintain state of charges of the first high voltage battery and the second high voltage battery within desired ranges.

In a further non-limiting embodiment of any of the foregoing methods, controlling the charging and discharging operations includes alternating between discharging the first high voltage battery and discharging the second high voltage battery to power an electric machine of the electrified vehicle.

In a further non-limiting embodiment of any of the foregoing methods, the method includes periodically reevaluating whether to charge or discharge each of the first high voltage battery and the second high voltage battery.

In a further non-limiting embodiment of any of the foregoing methods, the method includes prioritizing charging of the first high voltage battery over the second high voltage battery.

In a further non-limiting embodiment of any of the foregoing methods, the method includes discharging the first high voltage battery down to a predefined threshold prior to discharging the second high voltage battery.

In a further non-limiting embodiment of any of the foregoing methods, the method includes connecting the secondary electrical device to an expansion interface mechanism of the electrified vehicle.

In a further non-limiting embodiment of any of the foregoing methods, controlling the charging and discharging operations includes monitoring a plurality of battery parameters associated with each of the first high voltage battery and the second high voltage battery.

In a further non-limiting embodiment of any of the foregoing methods, the plurality of battery parameters include at least states of charge and battery cell temperatures of the first high voltage battery and the second high voltage battery.

An electrified vehicle according to another exemplary aspect of the present disclosure includes, among other things, a first high voltage battery, an expansion interface mechanism, a secondary electrical device connected to the expansion interface mechanism and including a second high voltage battery, and a battery charge controller configured with instructions for controlling charging and discharging operations of both the first high voltage battery and the second high voltage battery.

In a further non-limiting embodiment of the foregoing electrified vehicle, an electric machine is configured to either provide power to or receive power from one of the first high voltage battery and the second high voltage battery.

In a further non-limiting embodiment of either of the foregoing electrified vehicles, the battery charge controller is configured to command charging by alternating between charging the first high voltage battery and charging the second high voltage battery.

In a further non-limiting embodiment of any of the foregoing electrified vehicles, the secondary electrical device includes a slave battery charge controller in communication with the battery charge controller.

In a further non-limiting embodiment of any of the foregoing electrified vehicles, the expansion interface mechanism includes a first communications connector connectable to a second communications connector to establish a communications path, the battery charge controller operable to communicate with the slave battery charge controller over the communications path.

In a further non-limiting embodiment of any of the foregoing electrified vehicles, the expansion interface mechanism includes a first power connector connectable to a second power connector to dock the secondary electrical device to the electrified vehicle.

In a further non-limiting embodiment of any of the foregoing electrified vehicles, the secondary electrical device is a drone.

In a further non-limiting embodiment of any of the foregoing electrified vehicles, the expansion interface mechanism is installed within a cargo area of the electrified vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details an electrified vehicle battery system and method for exchanging power between the electrified vehicle and a secondary electrical device connected to the vehicle. These and other features are discussed in greater detail in the following paragraphs of this detailed description.

Figure 1:
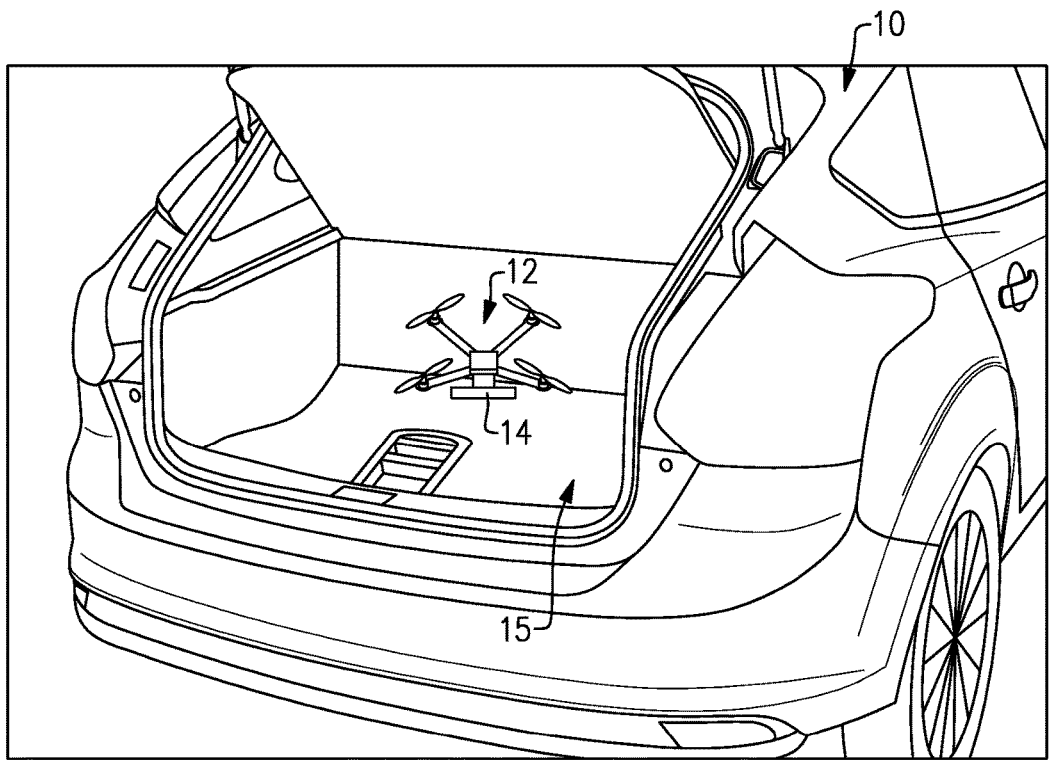
FIG. 1 schematically illustrates an electrified vehicle. A secondary electrical device is shown connected at an expansion interface mechanism of the electrified vehicle.

FIG. 1 schematically depicts portions of an electrified vehicle 10. The electrified vehicle 10 is depicted in this non-limiting embodiment as a car. However, trucks, vans, or any other automotive vehicle could also benefit from the teachings of this disclosure.

A secondary electrical device 12 is connected to the electrified vehicle 10. The secondary electrical device 12 could be a drone, bike, scooter, unmanned aerial vehicle (UAV), or any other electrical device. In the illustrated non-limiting embodiment, the secondary electrical device 12 is depicted as a drone.

The secondary electrical device 12 is connected to the electrified vehicle 10 at an expansion interface mechanism 14. Although shown schematically, the expansion interface mechanism 14 is similar to a docking station adapted to electrically connect the secondary electrical device 12 to the electrified vehicle 10. Thus, once connected, the secondary electrical device 12 is considered "docked" to the electrified vehicle 10. The expansion interface mechanism 14 allows power to be transferred between the respective energy storage devices (e.g., batteries) of the electrified vehicle 10 and the secondary electrical device 12 in order to expand the battery capacity, and thus extend the travel range, of the electrified vehicle 10.

In a further non-limiting embodiment, the expansion interface mechanism 14 is located in the trunk 15, or cargo area, of the electrified vehicle 10. However, other vehicle locations are also contemplated. For example, the expansion interface mechanism 14 could be installed in a roof, bumper, truck bed, etc.

Figure 2:
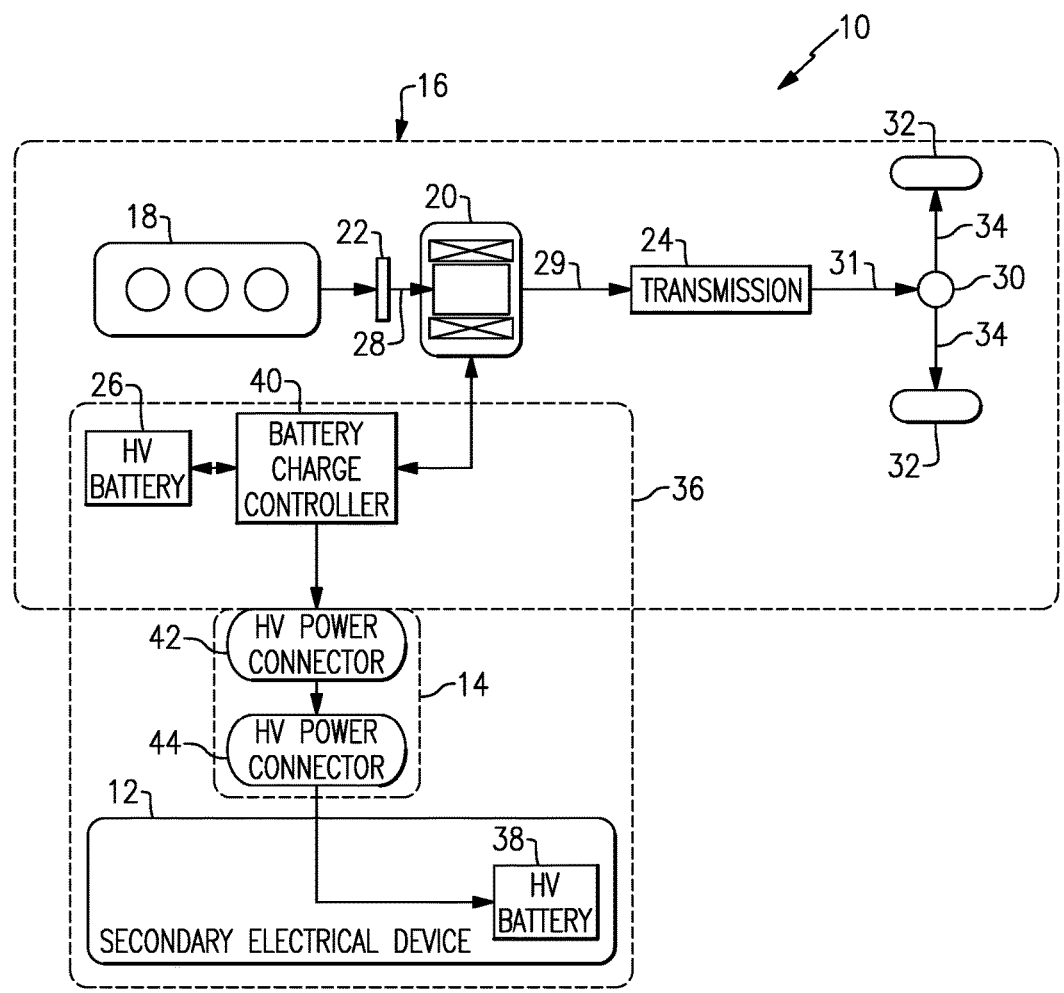
FIG. 2 illustrates an exemplary powertrain of the electrified vehicle of FIG. 1.

FIG. 2 schematically illustrates an exemplary powertrain 16 of the electrified vehicle 10 of FIG. 1. The powertrain 16 is shown and described herein as a non-limiting embodiment of one potential electrified powertrain. However, the electrified vehicle 10 could employ any electrified vehicle powertrain including but not limited to full electric powertrains and hybrid powertrains.

The exemplary powertrain 16 includes an engine 18, an electric machine 20, a disconnect clutch 22, a transmission 24, and a high voltage battery 26. The engine 18 and the electric machine 20 are both available drive sources for powering the electrified vehicle 10. The engine 18 generally represents a power source that may include an internal combustion engine such as a gasoline, diesel, or natural gas powered engine, or a fuel cell. The engine 18 generates power and corresponding torque that is supplied to the electric machine 20 when the engine disconnect clutch 22 is engaged.

The electric machine 20 could be any of a plurality of electric machine types. Examples include an electric motor, a generator, or a combined motor/generator. In a non-limiting embodiment, the electric machine 20 is a permanent magnet synchronous motor.

When the disconnect clutch 22 is at least partially engaged, power flow from the engine 18 to the electric machine 20 or from the electric machine 20 to the engine 18 is possible. For example, the engine disconnect clutch 22 may be engaged and the electric machine 20 may operate as a generator to convert rotational energy provided by a shaft 28 into electrical energy that is stored in the high voltage battery 26 or elsewhere. The disconnect clutch 22 can also be disengaged to isolate the engine 18 from the remainder of the powertrain 16 such that the electric machine 20 acts as a sole power source for propelling the electrified vehicle 10.

The transmission 24 may include gear sets that are selectively operated using different gear ratios by selective engagement of friction elements such as clutches, planetary gears, and brakes (not shown) to establish the desired multiple discrete or step drive ratios. The friction elements are controllable through a shift schedule that connects and disconnects certain elements of the gear set to control the ratio between a transmission input shaft 29 and a transmission output shaft 31. The transmission 24 may be automatically shifted from one ratio to another based on various vehicle and ambient operating conditions by an associated controller. The transmission 24 then provides powertrain output torque to the transmission output shaft 31.

The transmission output shaft 31 is connected to a differential 30. The differential 30 drives a pair of wheels 32 via respective axles 34 that are connected to the differential 30. In a non-limiting embodiment, the differential 30 transmits approximately equal torque to each wheel 32 while permitting slight speed differences, such as when the electrified vehicle 10 turns a corner. Different types of differentials or similar devices could be used to distribute torque from the powertrain 16 to one or more of the wheels 32. In some applications, torque distribution may vary depending on the particular operating motor condition, as a non-limiting example.

To drive the electrified vehicle 10 using the engine 18, the disconnect clutch 22 is at least partially engaged to transfer a portion of the engine torque through the disconnect clutch 22 to the electric machine 20, and then from the electric machine 20 to the transmission 24. The electric machine 20 may assist the engine 18 by providing additional power to turn the shaft 28. This operation may be referred to as hybrid mode or electric assist mode.

To drive the electrified vehicle 10 using the electric machine 20 as the sole power source, the power flow remains the same except the disconnect clutch 22 isolates the engine 18 from the remainder of the powertrain 16. Combustion in the engine 18 may be disabled or otherwise turned off during this time to conserve fuel. Power electronics may convert DC voltage from the high voltage battery 26 into AC voltage for consumption by the electric machine 20. This operation mode may be referred to as an electric only or EV mode.

In any mode of operation, the electric machine 20 may act as a motor and provide a driving force for the powertrain 16. Alternatively, the electric machine 20 could act as a generator and convert kinetic energy from the electrified vehicle 10 into electrical energy to be stored in the high voltage battery 26. The electric machine 20 may act as a generator while the engine 18 is providing propulsion power for the electrified vehicle 10, for example. The electric machine 20 may additionally act as a generator during times of regenerative braking in which rotational energy from spinning the wheels 32 is transferred back through the transmission 24 and is converted into electrical energy for storage in the high voltage battery 26, for example.

A battery system 36 is adapted to control charging and discharging operations of both the high voltage battery 26 (i.e., a first battery) of the electrified vehicle 10 and a high voltage battery 38 (i.e., a second battery) of the secondary electrical device 12. The high voltage battery 26 of the electrified vehicle 10 may be a traction battery pack that includes a plurality of battery cells or other energy storage devices capable of outputting electrical power to operate the electric machine 20 and/or other electrical loads of the electrified vehicle 10. The high voltage battery 38 is a source of power for the secondary electrical device 12 and may similarly include a plurality of energy storage devices that can store energy. Like the high voltage battery 26, the high voltage battery 38 can either output power to the electric machine 20 of the powertrain 16 or can accept power from the electric machine 20 when it is being operated as a generator.

The battery system 36 includes the expansion interface mechanism 14 and a battery charge controller 40. The secondary electrical device 12 may be connected to the powertrain 16 by virtue of the expansion interface mechanism 14. The expansion interface mechanism 14 may include a first power connector 42 associated with the electrified vehicle 10 and a second power connector 44 associated with the secondary electrical device 12. When the first power connector 42 and the second power connector 44 are connected to one another, such as by using a male-female connection arrangement, the secondary electrical device 12 is connected or docked to the electrified vehicle 10. Once docked, power may be shared or exchanged between the electrified vehicle 10 and the secondary electrical device 12.

The battery charge controller 40 is part of the electrified vehicle 10 and may control charging and discharging operations of both the high voltage battery 26 and the high voltage battery 38 when the secondary electrical device 12 is docked at the expansion interface mechanism 14. The battery charge controller 40 may communicate with a vehicle system controller (VSE) of the electrified vehicle 10 or any other controller for managing the charging and discharging operations. The battery charge controller 40 may include one or more control modules equipped with executable instructions for interfacing with and commanding operation of various components of the battery system 36. Each such control module may include a processing unit and non-transitory memory for executing the various control strategies and modes of the battery system 36. One exemplary control strategy of the battery system 36 is discussed below with reference to FIG. 4.

An exemplary function of the battery charge controller 40 is to monitor various battery parameters associated with each of the high voltage battery 26 and the high voltage battery 38. Non-limiting examples of battery parameters that may be monitored and analyzed include battery state of health, battery cell internal resistance, battery cell temperatures, battery management variables, battery discharge power limits, battery charge power limits, battery power commands, battery thermal management variables, battery state of charge (SOC), battery operating window variables, battery open circuit voltages, and battery voltage measurements under load. Any combination of these battery parameters may be analyzed as part of the determination of whether to charge or discharge the high voltage battery 26 and the high voltage battery 38.

Another exemplary function of the battery charge controller 40 is to monitor the operational mode of the powertrain 16 of the electrified vehicle 10. For example, the battery charge controller 40 may communicate with one or more controllers associated with the powertrain 16 to determine whether the electrified vehicle 10 is operating in an EV mode, a hybrid mode, or a regenerative braking mode. EV mode occurs when the electric machine 20 is being operated as the sole power source of the electrified vehicle 10, hybrid mode occurs when both the engine 18 and the electric machine 20 are used to power the electrified vehicle 10, and regenerative braking mode occurs during vehicle deceleration events in which the electric machine 20 acts as a generator to convert rotational energy into electrical energy. Other operating modes may also be employed by the electrified vehicle 10. The battery charge controller 40 may determine whether to charge or discharge the high voltage battery 26 and the high voltage battery 38 based at least partially on the detected operational mode.

Yet another exemplary function of the battery charge controller 40 is to control the transfer of power to and from each of the high voltage battery 26 and the high voltage battery 38. The battery charge controller 40 may be equipped with power electronics for converting the power between AC power and DC power as necessary during the power exchange.

Figure 3:
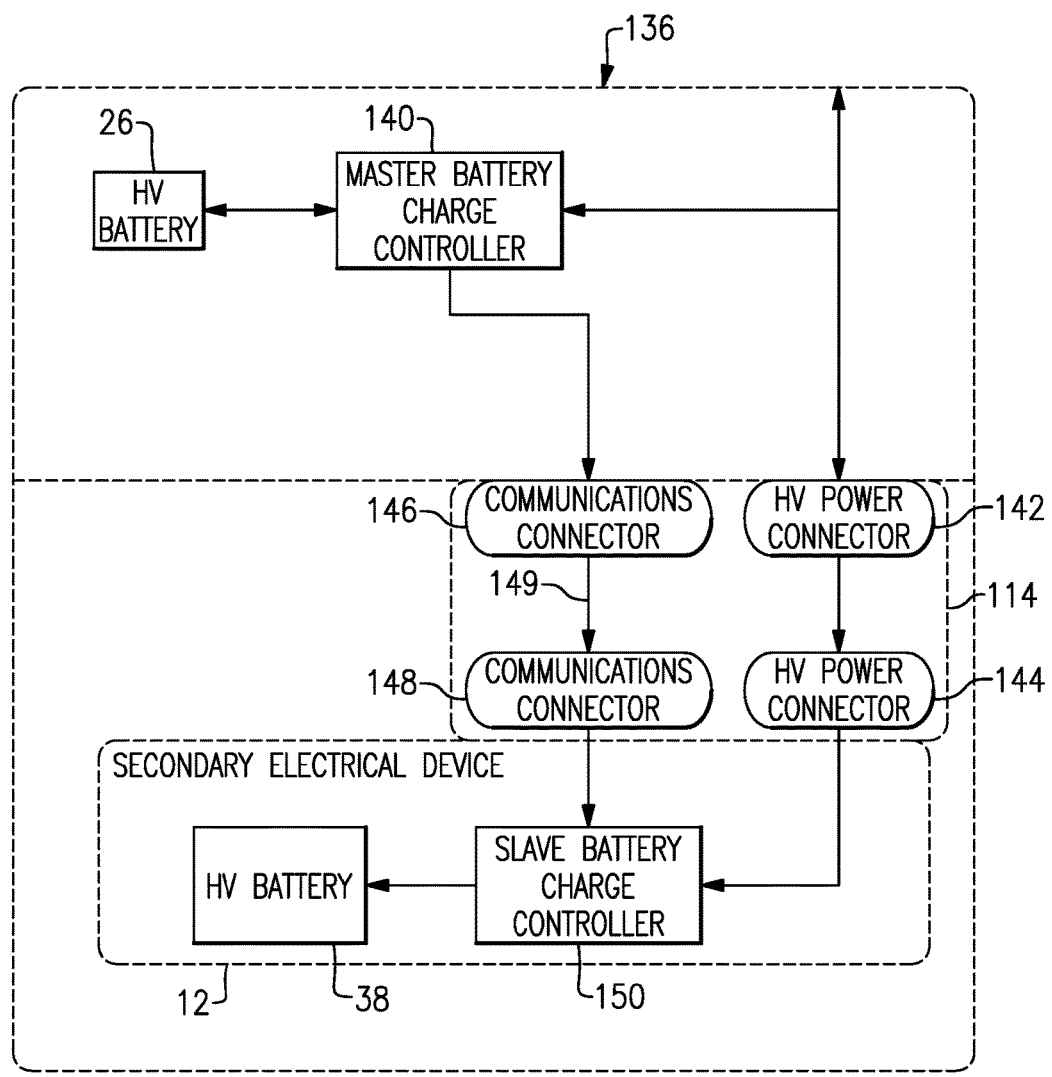
FIG. 3 illustrates an exemplary battery system of an electrified vehicle.

FIG. 3 illustrates another exemplary battery system 136 that may be employed by the electrified vehicle 10 of FIG. 1. The battery system 136 includes a first high voltage battery 26, a second high voltage battery 38, an expansion interface mechanism 114, a master battery charge controller 140, and a slave battery charge controller 150. The first high voltage battery 26 and the master battery charge controller 140 are part of the electrified vehicle 10, whereas the second high voltage battery 38 and the slave battery charge controller 150 are part of the secondary electrical device 12. The expansion interface mechanism 114 provides an interface for connecting the secondary electrical device 12 to the electrified vehicle 10.

The expansion interface mechanism 114 may include a first power connector 142 associated with the electrified vehicle 10 and a second power connector 144 associated with the secondary electrical device 12. When the first power connector 142 and the second power connector 144 are connected together, the secondary electrical device 12 is connected, or docked, to the electrified vehicle 10, and thus power is transferrable between the electrified vehicle 10 and the secondary electrical device 12.

The expansion interface mechanism 114 may additionally include a first communications connector 146 associated with the electrified vehicle 10 and a second communications connector 148 associated with the secondary electrical device 12. The first communications connector 146 and the second communications connector 148 are connectable to establish a communications path 149 upon docking the secondary electrical device 12 to the electrified vehicle 10. The master battery charge controller 140 may communicate with the slave battery charge controller 150 over the communications path 149 using any known communications standard. The master battery charge controller 140 may communicate command signals, diagnostic information, battery information, and other relevant information over the communications path 149 for controlling the slave battery charge controller 150.

In a non-limiting embodiment, the master battery charge controller 140 and the slave battery charge controller 150 cooperate together to manage charging and discharging operations of the first high voltage battery 26 and the second high voltage battery 38. In another non-limiting embodiment, the master battery charge controller 140 and the slave battery charge controller 150 control charging and discharging operations by alternating between charging the first high voltage battery 26 and the second high voltage battery 38. An alternating charging/discharging pattern can be executed continuously during operation of the electrified vehicle 10 when the secondary electrical device 12 is connected at the expansion interface mechanism 114.

Figure 4:
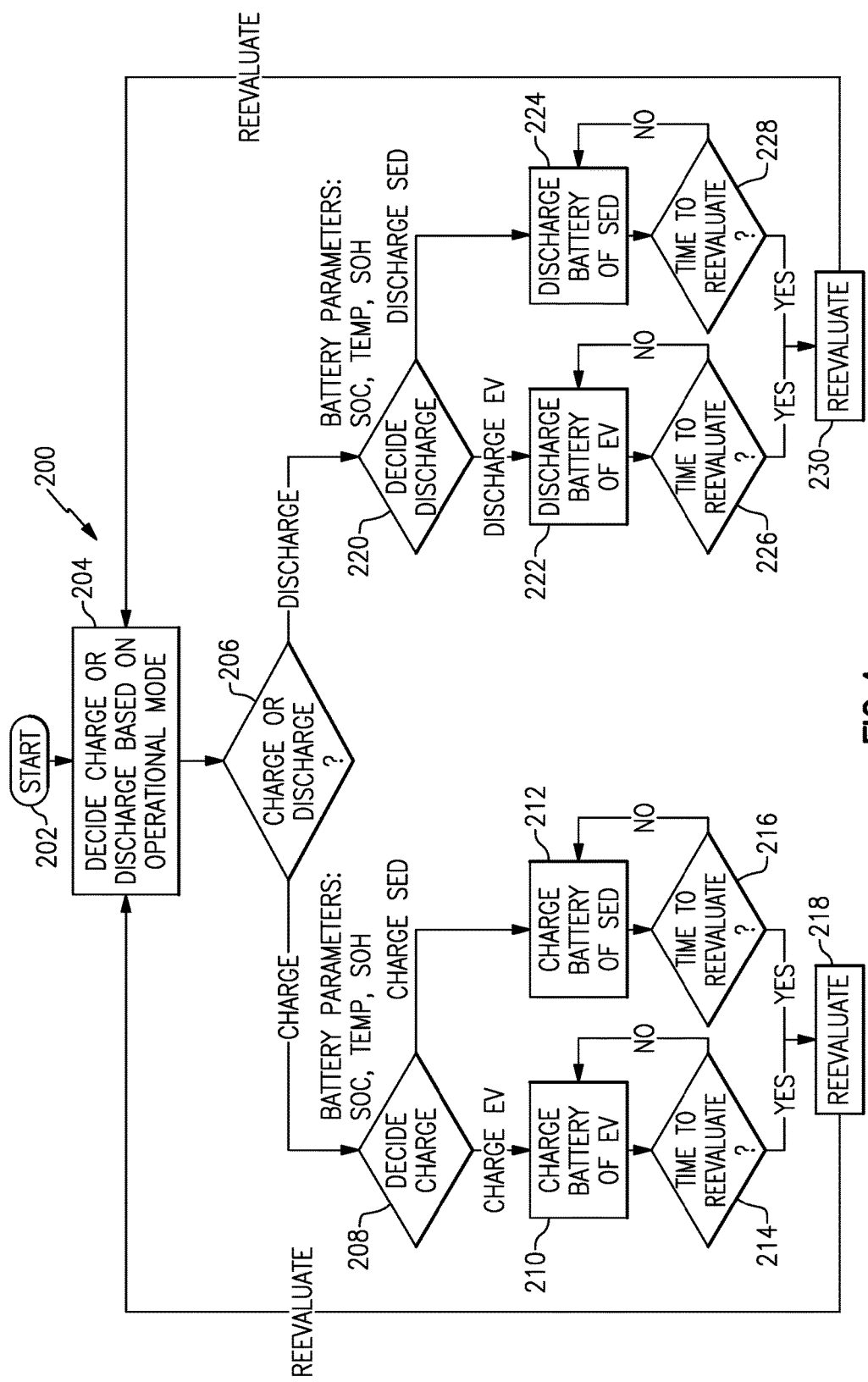
FIG. 4 schematically illustrates an exemplary control strategy for controlling charging and discharging operations of high voltage batteries of both an electrified vehicle and a secondary electrical device that is docked to the electrified vehicle.

FIG. 4, with continued reference to FIGS. 1-3, schematically illustrates a control strategy 200 for controlling the high voltage batteries 26, 38 of the electrified vehicle 10 and the secondary electrical device 12. The control strategy 200 is applicable to both the battery system 36 of FIG. 2 and the battery system 136 of FIG. 3. In a non-limiting embodiment, the battery charge controller 40 (or master battery charge controller 140) is programmed with one or more algorithms adapted to execute the exemplary control strategy 200, or any other control strategy. In another non-limiting embodiment, the control strategy 200 is stored as executable instructions in the non-transitory memory of a control module of the battery charge controller 40, 140.

The control strategy 200 begins at block 202. At block 204, the control strategy 200 determines whether to charge or discharge the high voltage batteries 26, 38 based on the current operational mode of the electrified vehicle 10. For example, in a non-limiting embodiment, the control strategy 200 may decide to charge one or both of the high voltage batteries 26, 38 during hybrid mode and/or regenerative braking mode, and may decide to discharge one or both of the high voltage batteries 26, 38 during EV mode. The decision to charge or discharge is shown schematically at block 206.

If the decision at block 206 is to charge, the control strategy 200 proceeds to block 208 and decides whether to charge the high voltage battery 26 of the electrified vehicle 10 (denoted as EV in FIG. 4) or the high voltage battery 38 of the secondary electrical device 12 (denoted as SED in FIG. 4) at block 208. This decision may be based on a variety of battery parameters including but not limited to battery SOC, battery cell temperatures, and the battery state of health of both the high voltage battery 26 and the high voltage battery 38.

The high voltage battery 26 and the high voltage battery 38 are generally not charged simultaneously. Instead, the control strategy 200 alternates between charging the high voltage battery 26 (shown schematically at block 210) and the high voltage battery 38 (shown schematically at block 212) to maintain the state of charge of both batteries 26, 38 within a desired range. In a non-limiting embodiment, the state of charge of both batteries 26, 38 is kept within a range between 60% and 70%, although the actual range will depend on the type of batteries used. The control strategy 200 generally prioritizes charging of the high voltage battery 26 of the electrified vehicle 10 over charging the high voltage battery 38 of the secondary electrical device 12. The high voltage battery 38 is charged at block 212 once the high voltage battery 26 is charged to within a desired SOC range.

This alternating charging pattern may be constantly reevaluated to determine whether or not to continue charging. For example, the decision to charge the high voltage battery 26 may be reevaluated at block 214 and the decision to charge the high voltage battery 38 may be reevaluated at block 216. Reevaluation may be deemed necessary if a predefined amount of time has passed or if some other threshold has been met. If reevaluation is determined to be necessary at either block 214 or 216, the control strategy 200 proceeds to block 218 to begin the reevaluation. The control strategy 200 may then return to block 204 and the entire strategy is repeated. The control strategy 200 may be constantly executed to continuously control the charging and discharging operations of the high voltage batteries 26, 38.

If the decision at block 206 is to discharge, the control strategy 200 proceeds to block 220 and decides whether to discharge the high voltage battery 26 of the electrified vehicle 10 or the high voltage battery 38 of the secondary electrical device 12. The high voltage battery 26 and the high voltage battery 38 are generally not discharged simultaneously. Instead, the control strategy 200 alternates between discharging the high voltage battery 26 (shown schematically at block 222) and the high voltage battery 38 (shown schematically at block 224) to maintain the state of charge of both batteries 26, 38 within a desired range, such as between 60% and 70%. During discharging operations, power from either the high voltage battery 26 or the high voltage battery 38 is used to power the electric machine 20 of the electrified vehicle 10. The control strategy 200 generally discharges the high voltage battery 26 of the electrified vehicle 10 down to a threshold level prior to beginning discharge of the high voltage battery 38 of the secondary electrical device 12. The high voltage battery 38 is discharged at block 224 once the high voltage battery 26 has been discharged down to a threshold level.

This alternating discharging pattern may be constantly reevaluated to determine whether or not to continue discharging. For example, the decision to discharge the high voltage battery 26 may be reevaluated at block 226 and the decision to discharge the high voltage battery 38 may be reevaluated at block 228. Reevaluation may be deemed necessary if a predefined amount of time has passed or if some other threshold has been met. If reevaluation is determined to be necessary at either block 226 or 228, the control strategy 200 proceeds to block 230 to begin the reevaluation process. Confirmation of the reevaluation strategy returns the control strategy 200 to block 204 and the entire strategy is repeated. The control strategy 200 may be constantly executed to continuously control the charging and discharging operations of the high voltage batteries 26, 38.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling charging and discharging operations of a first high voltage battery of an electrified vehicle and a second high voltage battery of a secondary electrical device connected to the electrical vehicle such that power from the electrified vehicle is selectively used to charge the second high voltage battery and power from the second high voltage battery is selectively discharged to power the electrified vehicle,
wherein the secondary electrical device is a separate device from the electrified vehicle that is powered by the second high voltage battery.

2. The method as recited in claim 1, wherein controlling the charging and discharging operations includes charging at least one of the first high voltage battery and the second high voltage battery if the electrified vehicle is operating in a hybrid mode.

3. The method as recited in claim 1, wherein controlling the charging and discharging operations includes charging at least one of the first high voltage battery and the second high voltage battery if the electrified vehicle is operating in a regenerative braking mode.

4. The method as recited in claim 1, wherein controlling the charging and discharging operations includes discharging at least one of the first high voltage battery and the second high voltage battery if the electrified vehicle is operating in an EV mode.

5. The method as recited in claim 1, wherein controlling the charging and discharging operations includes alternating between charging the first high voltage battery and charging the second high voltage battery to maintain state of charges of the first high voltage battery and the second high voltage battery within desired ranges.

6. The method as recited in claim 1, wherein controlling the charging and discharging operations includes alternating between discharging the first high voltage battery and discharging the second high voltage battery to power an electric machine of the electrified vehicle.

7. The method as recited in claim 1, comprising periodically reevaluating whether to charge or discharge each of the first high voltage battery and the second high voltage battery.

8. The method as recited in claim 1, comprising prioritizing charging of the first high voltage battery over the second high voltage battery.

9. The method as recited in claim 1, comprising discharging the first high voltage battery down to a predefined threshold prior to discharging the second high voltage battery.

10. The method as recited in claim 1, comprising connecting the secondary electrical device to an expansion interface mechanism of the electrified vehicle.

11. The method as recited in claim 1, wherein controlling the charging and discharging operations includes monitoring a plurality of battery parameters associated with each of the first high voltage battery and the second high voltage battery.

12. The method as recited in claim 11, wherein the plurality of battery parameters include at least states of charge and battery cell temperatures of the first high voltage battery and the second high voltage battery.

13. An electrified vehicle, comprising:
a first high voltage battery;
an expansion interface mechanism;
a secondary electrical device connected to said expansion interface mechanism and including a second high voltage battery for powering the secondary electrical device when the secondary electrical device is unconnected to the expansion interface mechanism; and
a battery charge controller configured with instructions for controlling charging and discharging operations of both said first high voltage battery and said second high voltage battery.

14. The electrified vehicle as recited in claim 13, comprising an electric machine configured to either provide power to or receive power from one of said first high voltage battery and said second high voltage battery.

15. The electrified vehicle as recited in claim 13, wherein said battery charge controller is configured to command charging by alternating between charging said first high voltage battery and charging said second high voltage battery.

16. The electrified vehicle as recited in claim 13, wherein said secondary electrical device includes a slave battery charge controller in communication with said battery charge controller.

17. The electrified vehicle as recited in claim 16, wherein said expansion interface mechanism includes a first communications connector connectable to a second communications connector to establish a communications path, said battery charge controller operable to communicate with said slave battery charge controller over said communications path.

18. The electrified vehicle as recited in claim 13, wherein said expansion interface mechanism includes a first power connector connectable to a second power connector to dock said secondary electrical device to said electrified vehicle.

19. The electrified vehicle as recited in claim 13, wherein said secondary electrical device is a drone.

20. The electrified vehicle as recited in claim 13, wherein said expansion interface mechanism is installed within a cargo area of said electrified vehicle.

21. The method as recited in claim 1, wherein the secondary electrical device is a drone, bike, scooter, or unmanned aerial vehicle.

22. An electrified vehicle, comprising:
a first high voltage battery installed on the electrified vehicle;
a docking station installed on the electrified vehicle;
an unmanned aerial vehicle configured to dock on the docking station and housing a second high voltage battery; and a battery charge controller installed on the electrified vehicle and configured with instructions for controlling charging and discharging operations of both the first high voltage battery and the second high voltage battery.

* * * * *